UNITED STATES PATENT OFFICE.

THEODORE MEYERINGH, OF GRAND RAPIDS, MICHIGAN, ASSIGNOR OF ONE-HALF TO GEORGE T. JOHNS, OF GRAND RAPIDS, MICHIGAN.

COMPOSITION FOR CLEANING SINKS.

SPECIFICATION forming part of Letters Patent No. 725,467, dated April 14, 1903.

Application filed December 20, 1902. Serial No. 136,038. (No specimens.)

*To all whom it may concern:*

Be it known that I, THEODORE MEYERINGH, a citizen of the United States, residing at Grand Rapids, in the county of Kent and State of Michigan, have invented a new and useful Composition of Matter for Cleaning, Polishing, and Renovating Sinks, Water-Closets, Washbowls, and other Analogous Purposes, of which the following is a specification.

My composition consists of the following ingredients, combined and compounded in the proportions stated: water, one fluid ounce; muriatic acid, thirty-two fluid ounces; sulfate of indigo, one fluid ounce. These ingredients are to be thoroughly mingled together by agitation or otherwise until the whole becomes thoroughly mixed into a homogeneous mass.

In using the above-named combination a quantity sufficient to cover the surface to be cleansed is applied by means of a brush or swab or other suitable device.

By the use of the above composition in the manner above described the article to which it has been applied may be quickly and thoroughly cleansed and renovated and all the foreign matter will be loosened and removed therefrom.

What I claim to have invented, and desire to secure by Letters Patent of the United States, is—

The herein-described composition of matter, consisting of water, muriatic acid and sulfate of indigo, substantially as described and for the purposes specified.

In testimony whereof I have hereunto set my hand in presence of two subscribing witnesses.

THEODORE MEYERINGH.

Witnesses:
   DAVID E. BURNS,
   GRACE VAN ZOEREN.